Sept. 11, 1962  I. N. KALLIN  3,053,543
SEALING MEANS
Filed Dec. 12, 1960
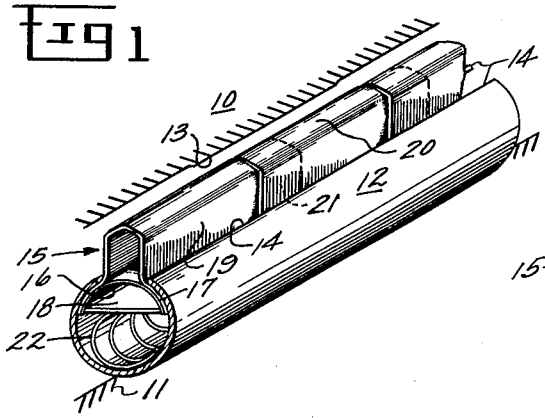
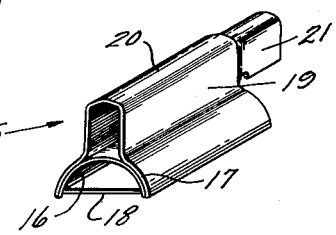
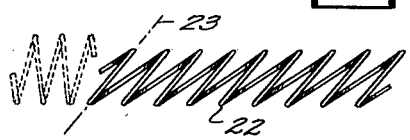
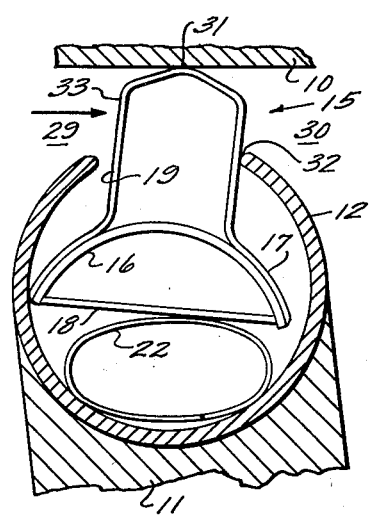
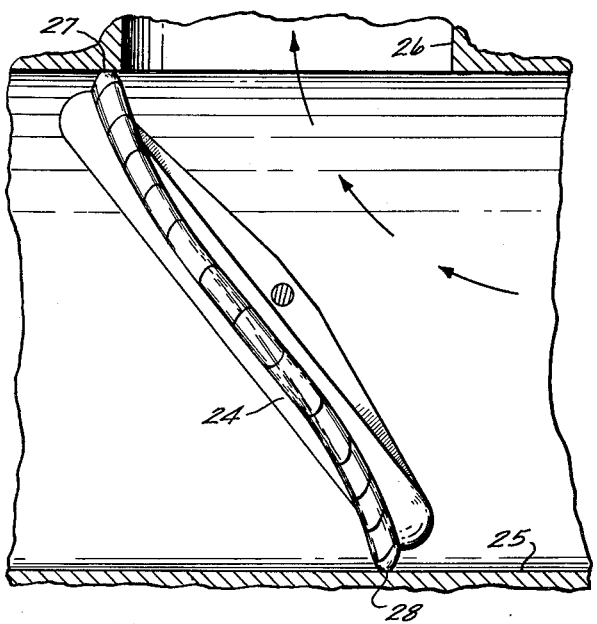
INVENTOR.
INGMAR N. KALLIN
BY
John F. Cullen
ATTORNEY—

3,053,543
SEALING MEANS
Ingmar N. Kallin, Cincinnati, Ohio, assignor to General Electric Company, a corporation of New York
Filed Dec. 12, 1960, Ser. No. 75,290
6 Claims. (Cl. 277—154)

The present invention relates to a sealing means and, more particularly, to a seal which will accommodate itself to sealing on uneven and non co-planar surfaces.

In sealing irregular or non co-planar surfaces, problems develop in obtaining a seal which is effective to prevent leakage yet is simple in construction. One of the problems in connection with irregular surfaces is that of getting the seal to adjust itself to the uneven surface and seal all parts of the surface effectively. In addition, in similar applications, it is desirable to have a seal which will accommodate itself to sealing non co-planar surfaces. For example, in sealing the edge of a butterfly valve in a conduit, it is clear that one end of the valve requires a seal at one surface and the other end of the valve requires a seal at the opposite surface. In between, the seal must curve itself around the inner surface of the pipe and still be effective. In order to be durable and effective at higher temperatures, it is desirable that the seal be made of metal which will withstand repeated and high temperature applications. Thus, the usual flexible or soft material seals are rendered ineffective in such applications whereas metallic seals are in difficulty in adjusting themselves, because of a lack of flexibility, to the peculiar sealing surfaces they encounter.

The main object of the present invention is to provide a seal that is effective against irregular and non co-planar surfaces.

A further object is to provide such a seal which lends itself to the metallic form and yet is relatively simple of construction.

Another object is to provide such a seal which, in sealing position, is designed to utilize the pressure of the fluid environment to form a positive seal.

Briefly stated, the seal of the instant invention comprises a tube with a slot extending lengthwise of the tube which slot may be wound around the tube in spiral fashion and is coextensive with the sealing area desired. Axial sealing pieces are disposed within the tube and are serially arranged to nest one within the other. Each sealing piece has a base portion within the tube that is wider than the slot and a projection extending through the slot and having a sealing surface for cooperation with an adjacent sealing surface. A biasing means, such as a spring, may be used to urge the seal pieces outwardly through the slot, which retains them in position because of the wide base, and against the adjacent sealing surface. Once engaged, the fluid that is being sealed against, assists the seal to maintain sealing engagement.

While the specification concludes with claims particularly pointing out and distinctly claiming the subject matter which I regard as my invention, it is believed the invention will be better understood from the following description taken in connection with the accompanying drawing in which:

FIGURE 1 is a perspective partial view of the seal of the instant invention;

FIGURE 2 is a perspective view of an individual sealing piece;

FIGURE 3 is a view of a spiral spring used to urge the sealing pieces into engagement with the sealing surface;

FIGURE 4 illustrates an application of the sealing means to a butterfly valve; and FIGURE 5 is a cross-sectional view illustrating the application of fluid pressure to the individual sealing piece.

Referring first to FIGURE 1, there is shown a typical sealing means of the instant invention wherein 10 is one of the sealing surfaces and may be smooth or slightly irregular as shown. The other sealing surface 11 may be on a movable member which is intended to be forced against surface 10 forming a seal therewith. Such movable member may be any desired surface such as the edge of a butterfly valve operating within a pipe or conduit. It should be appreciated that the sealing means of the instant invention is useful in many applications where an effective seal is desired as will be apparent as the description proceeds.

In order to seal surface 11 against surface 10, a tube 12 is secured by any suitable means to surface 11 and is coextensive in length with the sealing area desired. The description assumes surface 11 is movable and 10 is stationary but the reverse may be used. As shown in FIGURE 1, a segment of a typical sealing surface 13 is shown and it will be understood that tube 12 is coextensive with the desired extent of surface 13. As shown, tube 12, for convenience and ease of manufacture, may preferably be cylindrical although it is not limited to this shape. Tube 12 has a slot 14 extending longitudinally or lengthwise of the tube in order to accommodate sealing pieces generally indicated at 15.

Sealing pieces 15, which are designed to be biased against surface 13 for sealing, are composed of individual pieces as shown in FIGURE 2. Each sealing piece has a base 16 which is formed with a curvature 17 similar to the inner curvature of the surface of tube 12 to engage with the inner surface of the tube and for ease of manufacture since curved member 17 may be part of a standard tube. Base 16 is enclosed by a bottom plate 18 for a purpose to be described. Mounted on the base 16 is a projecting means 19 having a sealing surface 20 that may be axial, thereon. Each sealing piece 15 has, at the end of projecting means 19, a recessed portion 21 to nest within projecting means 19 of the adjacent sealing piece. The whole sealing piece may be hollow and formed of light-weight sheet metal parts.

Referring again to FIGURE 1, the nested sealing pieces 15 are axially and serially arranged within slot 14 and the bases 16 of the sealing pieces are wider than the slot in order to retain the piece within the tube at all times. In order to bias the sealing pieces 15 outwardly, a suitable biasing means is preferred although pressure alone may be satisfactory and is intended to be covered in the term biasing means. With a positive biasing means, spring 22 is disposed within the tube between the base 18 of the sealing piece and the tube. The curvature 17 of the base of the sealing piece engaging the inner surface of the tube ensures that the projecting means 19 is substantially normal to the tube surface at all times.

Sealing is accomplished by moving member 11 toward member 10 until the axially extending sealing surface 20 engages surface 13 to seal and each piece 15 is resilient within the tube to accommodate itself to the surface 13. Sufficient play is allowed between the individual sealing pieces so that they can accommodate themselves to an irregular surface as illustrated at 13 in FIGURE 1.

A suitable spring means, that lends itself to one continuous piece in any direction, is shown in FIGURE 3. This comprises nothing more than a common spiral spring that is bent or distorted out of its normal vertical plane shown dotted into an off-set plane 23. It can be seen that such a spring can be inserted into tube 12 which spring may bend or twist in all directions and will provide a substantially constant biasing force on sealing pieces 15.

One application of such a sealing means as has just been described, is illustrated in FIGURE 4. In this application, a butterfly valve 24 within pipe or conduit 25 is used to change direction of flow of fluid axially of the pipe or through outlet 26 depending upon the position of the valve. As can be seen from the figure, the sealing surface is desired across the top of the valve at 27 and across the bottom of the valve at 28. Obviously then, in between the sealing surface varies with the curvature of the pipe so that the projecting means 19 must reverse itself 180 degrees from point 27 to point 28. The instant sealing means lends itself very well to such an application or similar application. By winding the slot 14 around the tube in a spiral fashion, it can be seen that the sealing pieces 15 will be disposed substantially normal to the sealing surface at all times. Thus, the seal, with a winding form of slot, is very flexible in its application to non co-planar sealing surfaces.

Referring now to FIGURE 5, there is illustrated how the fluid provides positive sealing. This figure represents sealing in an environment wherein 29 is an area at higher pressure than 30. It can be seen that high pressure will urge sealing piece 15 against points 31 and 32 due to the pressure on surface 33. Thus, while the projection means 19 remains sealed substantially normal to the sealing surface 10, it also positively seals by using the assistance of the high pressure fluid. Preferably, movement of base 16 within tube 12 is limited to the middle third of the tube in order to keep friction forces low.

It can be seen that the instant seal is relatively simple and effective. The tube-slot arrangement permits the slot to wind around the tube to accommodate sealing pieces 15 to all conditions of surfaces wherein sealing is desired.

While I have hereinbefore described a preferred form of my invention, obviously many modifications and variations of the present invention are possible in the light of the above teachings. It is therefore to be understood that within the scope of the appended claims, the invention may be practiced otherwise than as specifically described.

I claim:
1. Means for sealing between two surfaces comprising, a tube secured to one of the surfaces and coextensive with the sealing area desired, said tube having a slot extending lengthwise of the tube, a plurality of axially extending nesting serially arranged sealing pieces having bases thereon and means projecting from said bases, said bases being disposed in said tube and being wider than said slot to retain said pieces within said tube, said projecting means extending through said slot and having sealing surfaces thereon, and means disposed within the tube between said bases and tube to bias said pieces outwardly for sealing against said other surface.

2. Apparatus as described in claim 1 wherein said tube is cylindrical in shape.

3. Apparatus as described in claim 1 wherein said slot extends lengthwise of said tube and winds on said tube.

4. Means for sealing between two surfaces comprising, a tube secured to one of the surfaces and coextensive with the sealing area desired, said tube having a slot extending lengthwise thereof, a plurality of axially extending nesting serially arranged sealing pieces having bases thereon and means projecting from said bases, said bases being disposed in said tube and being formed of a substantially similar curvature as the inner surface of the tube to engage therewith and being wider than said slot to retain said pieces within said tube, said projecting means extending through said slot substantially normal to the tube surface and having sealing surfaces thereon, and spring means disposed within the tube between said bases and tube to bias said pieces outwardly for sealing against said other surface.

5. Apparatus as described in claim 4 wherein said slot extends lengthwise of said tube and winds on said tube.

6. Apparatus as described in claim 4 wherein said slot extends lengthwise of said tube and winds on said tube and said spring means is a spiral spring bent out of its normal vertical plane.

References Cited in the file of this patent

UNITED STATES PATENTS

| | | |
|---|---|---|
| 2,414,797 | Brown | Jan. 28, 1947 |
| 2,562,167 | Bilde | July 31, 1951 |